(12) United States Patent
Hood

(10) Patent No.: US 9,837,671 B2
(45) Date of Patent: Dec. 5, 2017

(54) FUEL CELL FLUID DISTRIBUTION

(71) Applicant: INTELLIGENT ENERGY LIMITED, Loughborough, Leicestershire (GB)

(72) Inventor: Peter David Hood, Loughborough (GB)

(73) Assignee: INTELLIGENT ENERGY LIMITED, Loughborough (GB)

( * ) Notice: Subject to any disclaimer, the term of this patent is extended or adjusted under 35 U.S.C. 154(b) by 534 days.

(21) Appl. No.: 14/386,440

(22) PCT Filed: Mar. 14, 2013

(86) PCT No.: PCT/GB2013/050637
§ 371 (c)(1),
(2) Date: Sep. 19, 2014

(87) PCT Pub. No.: WO2013/140137
PCT Pub. Date: Sep. 26, 2013

(65) Prior Publication Data
US 2015/0050575 A1    Feb. 19, 2015

(30) Foreign Application Priority Data

Mar. 19, 2012  (GB) .................................. 1204736.1

(51) Int. Cl.
*H01M 8/02* (2016.01)
*H01M 8/04* (2016.01)
(Continued)

(52) U.S. Cl.
CPC ....... *H01M 8/04014* (2013.01); *H01M 8/026* (2013.01); *H01M 8/0258* (2013.01);
(Continued)

(58) Field of Classification Search
None
See application file for complete search history.

(56) References Cited

U.S. PATENT DOCUMENTS 6,893,759 B2 *  5/2005  Ooma ............... H01M 8/04029
429/437
7,226,680 B2   6/2007  Wexel et al.
(Continued)

FOREIGN PATENT DOCUMENTS

CN    201877513    6/2011
CN    102054997    10/2012
(Continued)

OTHER PUBLICATIONS

International Search Report and Written Opinion from International Patent Application No. PCT/GB2013/050637; dated Jul. 3, 2013.
(Continued)

*Primary Examiner* — Jonathan Crepeau
(74) *Attorney, Agent, or Firm* — Baker & Hostetler LLP

(57) ABSTRACT

A bipolar fuel cell plate (300) for use in a fuel cell comprising a plurality of flow field channels (704) and a coolant distribution structure (708) formed as part of the fluid flow field plate. The coolant distribution structure is configured to direct coolant droplets (701) into the flow field channels. The coolant distribution structure comprises one or more elements (710) associated with one or more flow field channels, the elements having a first surface (712) for receiving a coolant droplet and a second surface (714) having a shape that defines a coolant droplet detachment region for directing a coolant droplet into the associated field flow channel.

19 Claims, 4 Drawing Sheets

(51) Int. Cl.
*H01M 8/04014* (2016.01)
*H01M 8/0258* (2016.01)
*H01M 8/026* (2016.01)
*H01M 8/0267* (2016.01)
*H01M 8/04007* (2016.01)
*H01M 8/0206* (2016.01)
*H01M 8/04119* (2016.01)
*H01M 8/1018* (2016.01)

(52) U.S. Cl.
CPC ..... *H01M 8/0267* (2013.01); *H01M 8/04059* (2013.01); *H01M 8/1018* (2013.01); *H01M 8/0206* (2013.01); *H01M 8/04134* (2013.01); *H01M 2008/1095* (2013.01)

(56) References Cited

U.S. PATENT DOCUMENTS

| 7,794,863 | B2 | 9/2010 | Horiguchi |
| 8,216,736 | B2 | 7/2012 | Kwon |
| 2004/0112740 | A1 | 6/2004 | Shen et al. |
| 2010/0261087 | A1 | 10/2010 | Shirvanian et al. |
| 2011/0223495 | A1* | 9/2011 | Perry ................ H01M 8/04059 429/408 |
| 2011/0274999 | A1* | 11/2011 | Mohri ................. H01M 8/0206 429/455 |

FOREIGN PATENT DOCUMENTS

| EP | 1 286 404 B1 | 5/2008 |
| JP | 5409142 B2 | 2/2014 |
| KR | 100766154 | 10/2007 |
| WO | 2006/031470 | 3/2006 |
| WO | WO 2011142745 | * 11/2011 |

OTHER PUBLICATIONS

Search Report under Section 17 dated Jun. 15, 2012, issued in GB patent application 1204736.1.
International Preliminary Report on Patentability dated Oct. 2, 2014, issued in International patent application PCT/GB2013/050637.

* cited by examiner

FUEL CELL FLUID DISTRIBUTION

CROSS-REFERENCE TO RELATED APPLICATIONS

This application is a National Stage of International Patent Application No. PCT/GB2013/050637, filed Mar. 14, 2013 and claims priority to foreign application GB 1204736.1, filed Mar. 19, 2012, the contents of which are incorporated herein by reference in their entirety.

The invention relates to methods and apparatus for distributing coolant to flow field channels in fuel cell plates.

Polymer electrolyte membrane (PEM) based fuel cells require as a minimum a supply of two fluid feeds, containing fuel gas (typically hydrogen) and oxidant (typically air). Cooling is normally also required, which may be provided through the oxidant feed, i.e. across the cathode of the fuel cell, or via a dedicated coolant feed. A separate coolant feed may be provided in the form of a series of separate channels isolated from the oxidant and fuel channels but arranged to extract heat from each individual fuel cell making up a fuel cell stack. An alternative cooling arrangement is to provide additional water in a controlled way through the cathode side of each fuel cell. Such additional water can function to extract heat, most efficiently by evaporating within the fuel cell and exiting as vapour. To maximise the efficiency of operation it is important to introduce a controlled amount of water in a precisely defined way across the width of each fuel cell. As each fuel cell may be of the order of 1 mm or less in thickness and several centimeters in width, achieving a desired level of control can be difficult.

One way of achieving a degree of control over the distribution of coolant is with the use of an additional shim component positioned along an edge of a fuel cell plate, the shim having etched features such as channels to direct fluids. Such shims, and the etching processes used to generate fine features, add complexity and expense to the manufacturing process. A more cost effective solution is therefore required.

An alternative way of achieving a controlled degree of water cooling within a fuel cell is disclosed in WO 2007/129030, in which a folded edge of a fuel cell plate is used to introduce a controlled amount of cooling water to a cathode side of a fluid flow feed plate. A plurality of channels is provided within the fold by means of a surface texture applied to one or both inside faces of the folded region. Coolant water is forced through the folded region and exits into cathode channels extending across the plate.

A problem with providing such a mechanism for cooling is in achieving a controlled degree of flow across the plate, together with ensuring that the distribution of coolant across the width of the plate is uniform. Furthermore, conventional methods of forming coolant channels in the plate are generally inadequate to provide the degree of fine control and small tolerances required for a uniform coolant flow rate.

According to a first aspect of the invention, there is provided a bipolar fuel cell plate for use in a fuel cell comprising:
  a plurality of flow field channels;
  a coolant distribution structure formed as part of the fluid flow field plate, the coolant distribution structure configured to direct coolant droplets into the flow field channels;
  wherein the coolant distribution structure comprises one or more elements associated with one or more flow field channels, the elements having a first surface for receiving a coolant droplet and a second surface having a shape that defines a coolant droplet detachment region for directing a coolant droplet into the associated field flow channel.

Use of such a coolant distribution structure can promote accurate and even coolant distribution as well as reducing sensitivity of the fuel cell to orientation, vibration, shake and varying cathode flow rates.

The bipolar fuel cell plate may further comprise a plurality of coolant introducing openings configured to provide coolant droplets to the first surface of the elements.

The elements may be located in a line of sight between the coolant introducing openings and the flow field channels. Locating the elements in the line of sight between the coolant introducing openings and the flow field channels can ensure that the coolant droplets encounter the elements as they pass from the coolant introducing openings to the flow field channels thereby improving the improving the accuracy and uniformity of coolant distribution.

The elements may each be associated with two coolant introducing openings. In this way, two received coolant droplets can pass along respective side surfaces of the elements before coming together at the second surface where they detach from the element together.

The bipolar fuel cell plate may further comprise a plurality of air introducing openings for providing air to the flow field channels. Air received from the air introducing openings may be configured to cause droplets to pass from the coolant distribution structure to the flow field channels. The air received from the air introducing openings may be configured to cause droplets to pass from the coolant introducing openings to the first surface of the elements. In this way, the received cathode air can be used to guide the coolant droplets.

The air received from the air introducing openings may be configured to cause the coolant droplets to travel along a side surface of an element as they pass from the first surface to the second surface of the element. The coolant droplets may remain in contact with the side surfaces of the elements due to surface tension.

The droplet detachment region may define an apex in the shape of the second surface of the elements. The droplet detachment region may have a lowest radius of curvature in the second surface of the elements in the coolant distribution structure. In this way, the directionality and point of detachment of the coolant droplet can be accurately controlled.

The elements may be configured to support a gas diffusion layer. The elements may be configured to support the gas diffusion layer beyond the ends of the fluid flow channels thereby keeping open the openings into the flow field channels.

The bipolar fuel cell plate may further comprise a support structure comprising a plurality of support elements at the downstream end of the flow field channels. The support elements may be configured to support a gas diffusion layer. In this way, the support elements can be configured to support the gas diffusion layer beyond the ends of the fluid flow channels thereby keeping open the openings out of the flow field channels.

The support elements may be the same shape as the elements of the coolant distribution structure. This can assist in providing uniform flow through the flow field channels.

The coolant distribution structure may comprise an element associated with each of the flow field channels. The coolant may be water. The bipolar fuel cell plate may be made from pressed steel.

The height of the elements in the coolant distribution structure may be substantially the same as the height of corrugations that define the fluid flow channels. The height of the support elements in the support distribution structure may be substantially the same as the height of corrugations that define the fluid flow channels. This can enable the gas diffusion layer to be placed flat on the bipolar fuel cell plate.

The bipolar fuel cell plate may further comprise first and second arrays of channels formed in a surface thereof within a folded region of the plate. The first array of channels may extend from an edge of the plate across a first internal face of the folded region. The second array of channels may extend across a second opposing face of the folded region in a second direction transverse to the first direction. Openings of the first array of channels at the edge of the plate may be configured to provide coolant droplets to the first surface of the elements. The folded region may comprise a port through the thickness of the plate and in fluid communication with the arrays of fluid distribution channels.

Aspects and embodiments of the invention are described in further detail below by way of example and with reference to the enclosed drawings in which.

Figure 1:
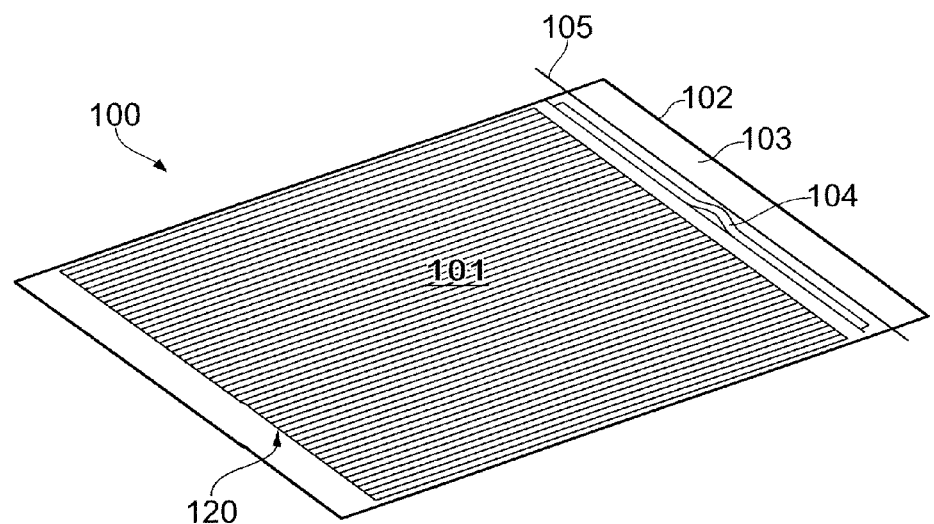
FIG. 1 is a perspective view of a bipolar fuel cell plate with fluid feed distribution channels formed along an edge.
Figure 2:
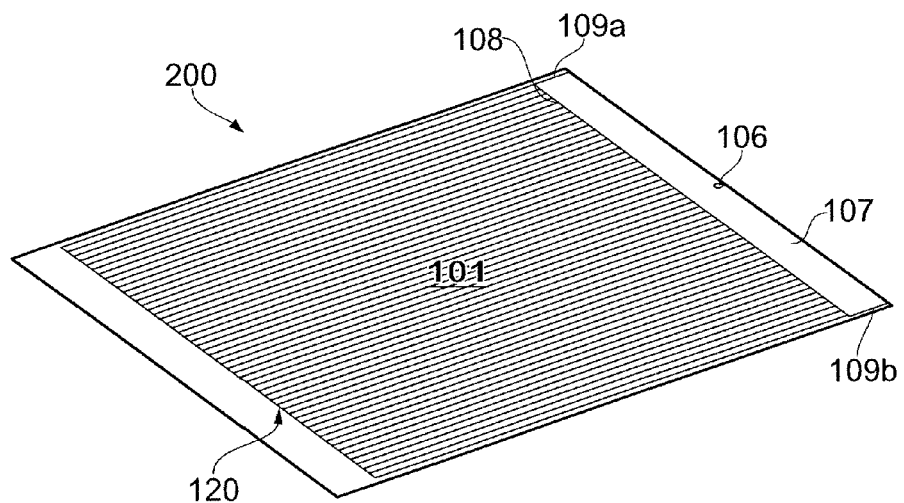
FIG. 2 is a perspective view of a bipolar fuel cell plate similar to that in FIG. 1 after a folding operation.

Shown in FIG. 1 is an exemplary bipolar fuel cell plate 100 after operations to form a corrugated cathode fluid flow field region 101. The cathode fluid flow region comprises a plurality of flow field channels, which may also be referred to as cathode fluid flow channels. Along a first edge 102 of the plate 100 is formed a first array of micro-channels 103 and a second array of larger fluid feed channels 104 extending across the width of the plate 100, the first array 103 extending to the edge 102 of the plate. Following these operations, the plate is folded along a fold line 105, resulting in the form of plate 200 illustrated in FIG. 2, in which the first and second arrays 103, 104 are enclosed within the folded region 107. A fluid entry port 106 is formed through the thickness of the plate 200, either before or after the folding operation, allowing access for coolant into the folded region 107 and along the now enclosed channels 103, 104. In use, coolant flowing into the folded region 107 through the port 106 is distributed across the width of the plate along the enclosed second array of channels 104 and transported along the first array of channels 103 towards the edge 108 of the folded region 107, which corresponds to the edge 102 of the unfolded plate 100.

Figure 3:
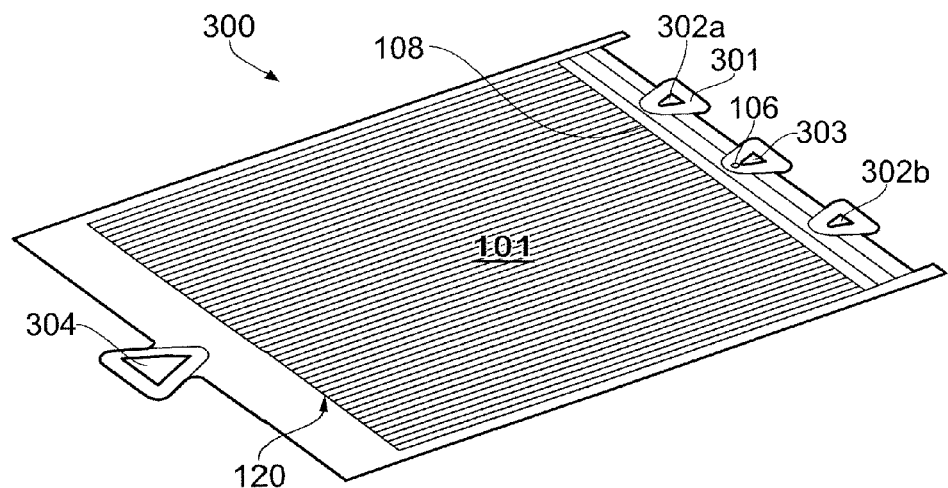
FIG. 3 is a perspective view of the bipolar fuel cell plate of FIG. 2 after application of an over-moulded gasket around a periphery of the plate.

FIG. 3 illustrates the bipolar plate 300 following a further operation to apply an over-moulded gasket 301 to the peripheral edge of the plate 300. The gasket 301 encapsulates the folded region 107 along opposing open edges 109a, 109b (FIG. 2), while leaving the long edge 108 of the folded region 107 open. The moulded gasket 301 also provides various surface features to allow a cathode air supply to be transmitted to the cathode flow field 101 via one or more air inlet ports 302a, 302b. The gasket 301 also forms a coolant entry port 303 connected to port 106 for access to the folded region 107. A cathode outlet port 304 is provided adjacent an opposing edge of the plate 300, in fluid communication with the cathode fluid flow field 101.

Figure 4:
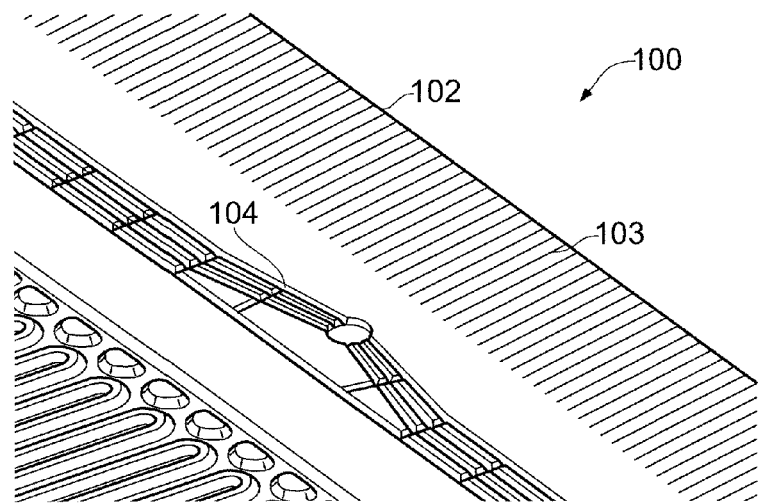
FIG. 4 is a partial perspective view of an edge of the plate in FIG. 1.
Figure 5:
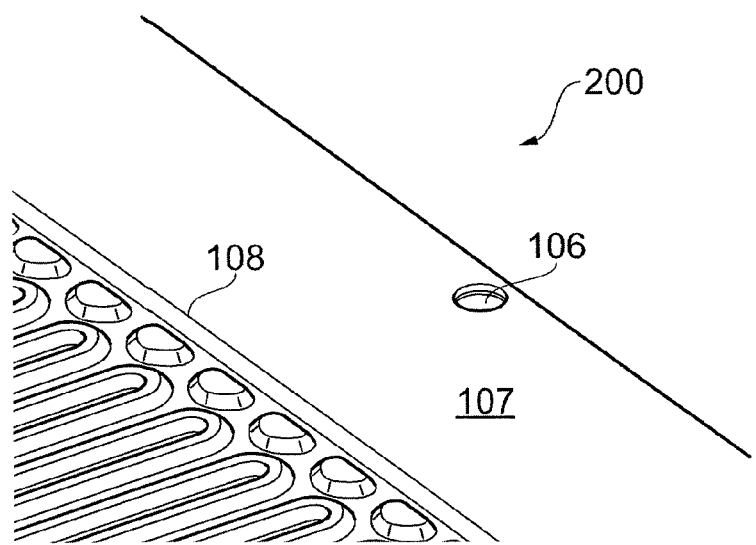
FIG. 5 is a partial perspective view of an edge of the plate of FIG. 2.

FIGS. 4 and 5 show more detailed views of an edge portion of the bipolar plate 100 before and after a folding operation to form the folded region 107. The first array of parallel micro-channels 103 is formed along the edge 102 of the plate 100. Also visible in FIG. 3 is the second array of larger channels 104 formed adjacent to the first array of micro-channels 103, the larger channels configured to distribute coolant from the port 106 across the width of the plate 100 within the folded region 107. The second array of fluid channels 104 are in the form of a grid of intersecting channels, a first set extending across the width of the plate and a second set transverse to, and interconnecting, the first set. The first set of channels serve to transport fluid from the central port 106 (FIG. 5) across the width of the plate 200, while the second set of channels stabilise the geometry of the plate, reducing any distortion during the folding process to form the folded region 107. The second set of channels also serve to transport coolant fluid to the front channel, i.e. the channel closest to the edge 108 (FIG. 5) from the other channels. Having multiple channels in the first set increases the cross sectional area of the channels for fluid flow across the plate while maintaining a geometry that resists collapse in subsequent processing and in assembly of the fuel cell stack. In the embodiments illustrated, all of the channels in the first set extend across the full width of the plate, so as to reduce distortion to the plate, although this feature is not essential to the invention, as the channels only need to transport fluid across the width of the cathode fluid flow region 101.

The first array of channels 103 are oriented in a direction across the surface of the plate 100 transverse to the direction of the channels in the second array 104. A piercing is formed in the plate 100 to form the port 106 either before or after the folding operation. In use, coolant flows into the folded region 107 through the port 106 and into the second array of channels 104 (FIG. 4). The coolant is distributed across the width of the plate along the folded region 107 by the second array of channels 104 and exits the folded region by travelling along the channels in the first array 103, leaving the folded region 107 along the edge 108 of the folded plate 200. By making the cross-sectional dimensions of the channels in the second array 104 larger than those of the first array 103, a larger pressure drop is created between the edge 108 of the folded region and the second array 104 compared to that across the width of the plate along the second array 104, ensuring a more uniform distribution of coolant out of the edge 108 of the folded region 107. The cross-sectional dimensions of the channels in the second array are preferably at least twice, and optionally at least three or four times those of the channels in the first array 103. For example, if the channels in the first array 103 have a depth or width of around 20 µm the comparable dimensions in the second array 104 may be at least 40 µm, 60 µm or 80 µm in depth or width. Due to the larger dimensions of the channels in the second array 104, conventional pressing or embossing techniques may be used to form the channels.

Figure 6:
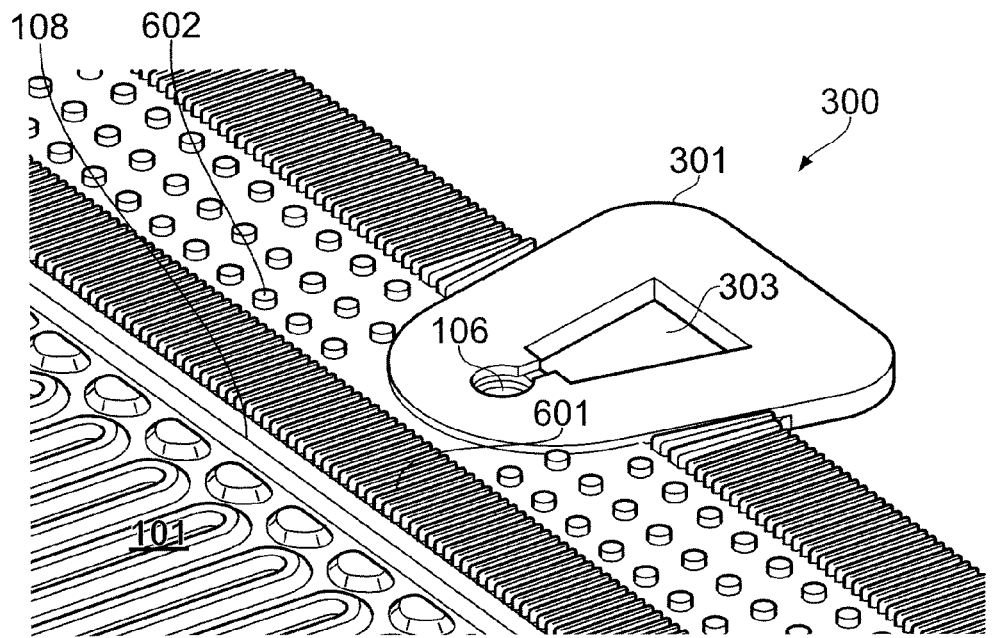
FIG. 6 is a partial perspective view of an edge of the plate of FIG. 3.

FIG. 6 show a detailed view of the edge of the bipolar plate after the gasket 301 is applied, which completes the bipolar plate construction. The view shown indicates the moulded water inlet port 303 and the piercing through the plate forming the port 106 for accessing the folded region. The gasket geometry also forms fluid flow paths for air flow across the plate 300 through to the cathode fluid flow field 101 in the form of castellations 601 and open areas comprising isolated projections 602.

Figure 7:
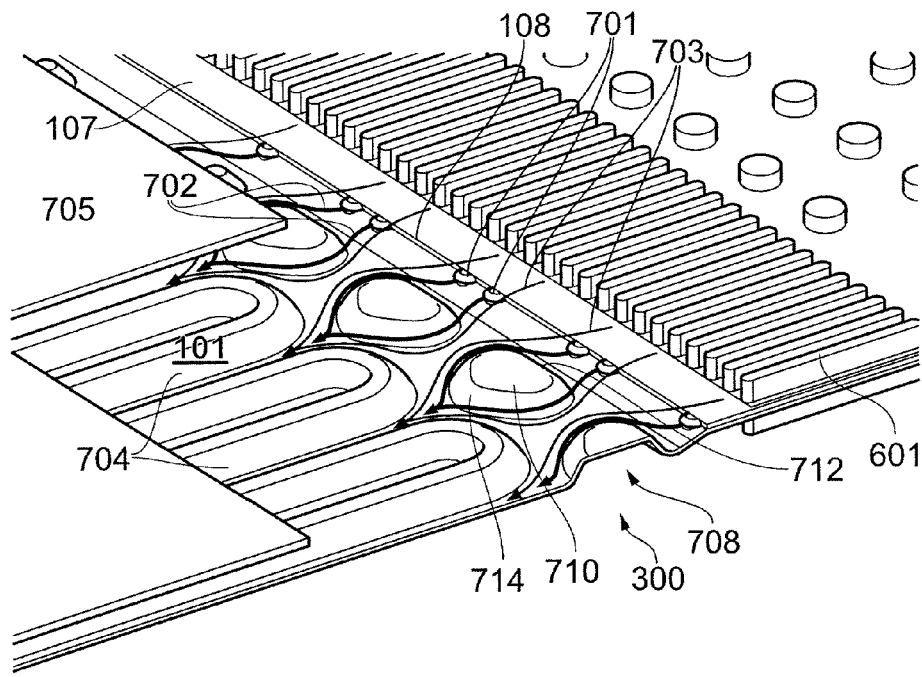
FIG. 7 is a partial perspective view of the edge of the plate in FIG. 6, illustrating fluid flow from the fluid feed distribution channels into a cathode fluid feed region.

A detailed schematic view of the folded region 107 of the plate 300 is shown in FIG. 7. A cutaway view of an overlying gas diffusion layer 705 is shown across the cathode fluid flow field 101.

A coolant distribution structure 708 is located between the edge 108 of the folded region and the cathode fluid flow field 101. In this example, the coolant is water and the coolant distribution structure will be referred to as a water distribution structure 708. The water distribution structure 708 has a plurality of elements 710 that direct or focus water droplets into flow field channels 704 in the cathode fluid flow field 101 as described in more detail below.

Water droplets 701 are shown forming at the edge 108 of the folded region 107, the droplets 701 forming at the ends of the micro-channels enclosed within the folded region 107. The ends of the micro-channels may be referred to as water introducing openings. Once the water droplets 701 reach a size sufficient to break surface tension, they are drawn from the ends of the micro-channels to a first surface 712 of an element 710 in the water distribution structure 708 by air flow from the castellations 601 in the gasket. The openings from the castellations 601 may be considered as air introducing openings. The direction of travel of the water droplets is shown with arrows 702 and the direction of air flow is shown with arrows 703.

In this example, the openings of two micro-channels are associated with a single element 710 in the water distribution structure 708 such that two water droplets 701 are provided to a first surface 712 of the elements 710. The air flow 703 then causes each water droplet 701 to travel around side surfaces of the element 710. The water droplets 701 keep in contact with the side surface of the element 710 due to surface tension. The surface tension with the side surfaces of the element 710 is greater than the surface tension that was experienced at the edge 108 of the folded region 107 as the contact surface area is greater.

The water droplets 701 travelling around each side surface of the element 710 then come together at a second surface 714 of the element 710. The second surface 714 has a shape that defines a water droplet detachment region. This droplet detachment region may also be referred to as a release point. When the water droplets 701 come together on the second surface 714 the mass of water exceeds the retention force due to surface tension. The combined droplet detaches from the element and is drawn into a cathode fluid flow channel 704 by the air flow 703. Use of the surfaces 712, 714 of the element 710 in this way can enable water droplets to be accurately and evenly directed into the cathode fluid flow channels 704.

In this example the droplet detachment region is an apex, which may be referred to as a region that has a lower radius of curvature than the rest of the second surface. Such a shape can advantageously provide control as to where on the surface of the element 710 the water droplets 701 leave the water distribution structure 708.

As the droplets travel along the fluid flow channels 704 heat is extracted from the plate 300 by evaporation of water in the droplets 701.

Controlling transport of cooling water droplets using surface tension compared to relying solely on the cathode air flow not only promotes accurate water distribution but also reduces the sensitivity of the fuel cell stack to orientation, vibration, shake and varying cathode flow rates.

In addition to directing water droplets into the fluid flow channels 704, the water distribution structure 708 also serves as a support structure to support the gas diffusion layer 705. In particular, the water distribution structure 708 supports the edges of the gas diffusion layer 705 that extend beyond the ends of the fluid flow channels 704. In this way, the openings to the fluid flow channels can be kept open for receiving the required air 703 and water 702. The water distribution structure 708 also allows the inter digitized cathode flow field 101 to function by bringing the diffuser 705 past the return features on the flow field 101 that defines the inlet and outlet tracks.

The height of the elements 710 in the water distribution structure 708 may be substantially the same as the height of the corrugations that define the fluid flow channels 704.

A similar coolant distribution structure 708 may also be provided at the downstream end 120 (FIGS. 1-3) of the cathode fluid flow field 101, comprising a plurality of support elements forming a support structure similar to the elements 710 shown in FIG. 7. The principle function of the coolant distribution structure is to support the gas diffusion layer 705 that is shown in FIG. 7, thereby keeping the openings at the downstream end 120 of the fluid flow channels open. It can be advantageous for the support elements at the downstream end 120 to be of the same shape as the elements 710 in the water distribution structure such that the flow through the channels 704 is not unduly impeded at the exit points of the channels 704. It can also be beneficial for the elements at each end of the channels to be sympathetically shaped so as to make efficient use of tooling.

An alternative to using micro-channels 103 in the bipolar plate is to introduce an extra component into the fold, this could be a material of a porous nature (although the defined water droplet generating points at the edge of the fold would be lost) or a metallic shim containing coined, pressed or chemically etched micro channels. Therefore, in some embodiments, the micro-channels may be considered as optional.

Figure 8:
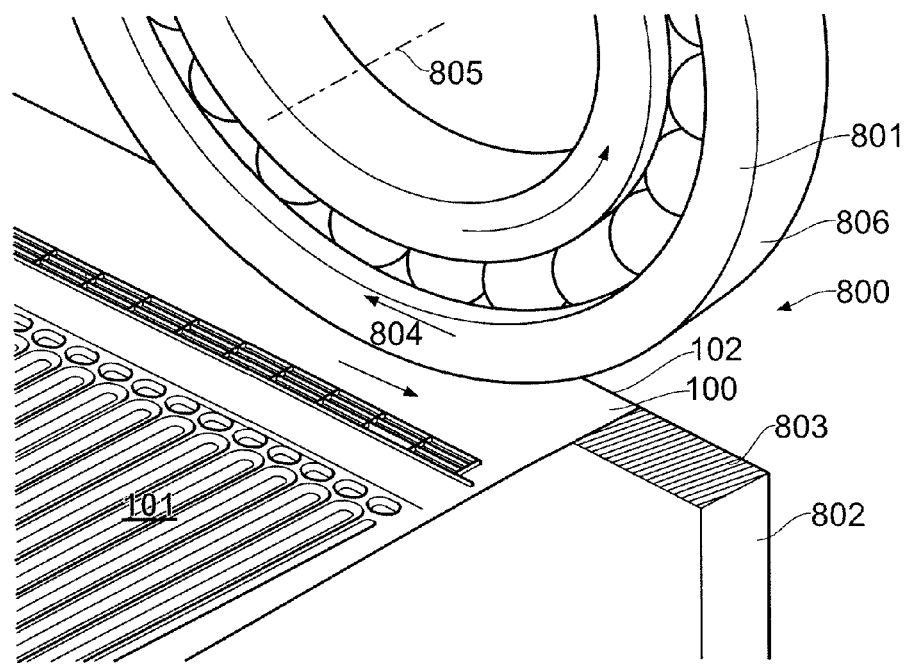
FIG. 8 is a partial perspective view of a machining operation for forming fluid feed distribution channels in a fuel cell plate.

FIG. 8 is a schematic diagram of a detailed view of an apparatus 800 for providing the first array of micro-channels on the cathode face of the plate 100. The apparatus 800 comprises a roller 801 and a die 802, a planar surface of the die 802 having an array of ridges 803. The ridges 803 are configured to form the first array of micro-channels along the edge 102 of the plate 100 as the roller 801 moves relative to the plate (arrows 804) while applying pressure through the thickness of the plate 100. The use of a rolling process against a planar die, rather than using a linear pressing or coining operation, allows for a greater degree of control of the uniformity of the channel geometry across the width of the plate 100 and allows the process to be carried out after a pressing operation to form the cathode fluid flow field 101 (the reverse side of which is shown in FIG. 8).

Typically each channel will have a cross section of approximately 20 microns wide and 15 microns in depth. The cross sectional area for each channel will generally need to be manufactured within a ±2% variation to achieve a satisfactorily uniform water distribution in operation. This is possible to achieve by using a rolling element while maintaining a constant force across the thickness of the plate.

The rotational axis 805 of the rolling element 801 may be orthogonal to the direction of travel 804 and parallel to the direction of channels formed on the plate 100. In alternative embodiments the channels may be oriented at an angle to the rotational axis 805, either by rotating the axis 805 relative to the die 802 or by aligning the ridges 803 in a direction away from orthogonal. The effect of this would be to progressively form each micro channel as the roller 801 is traversed relative to the die 802. If the roller axis 805 is aligned away from being orthogonal to the direction of traverse 804, the resultant slippage between the roller and the plate 100 may be accommodated by having the surface 806 of the roller 801 tapered.

The bipolar plate 100 is preferably made of steel, with an over-moulded elastomeric gasket 301. The gasket 301 may alternatively be made of a separate component laid on the plate during assembly of a fuel cell stack.

Other embodiments are intentionally within the scope of the invention as defined by the appended claims.

The invention claimed is:

1. A bipolar fuel cell plate for use in a fuel cell comprising:
   a plurality of flow field channels;
   further comprising first and second arrays of channels formed in a surface thereof within a folded region of the plate, the first array of channels extending from an edge of the plate across a first internal face of the folded region, the second array of channels extending across a second opposing face of the folded region in a second direction transverse to the first direction, wherein openings of the first array of channels at the edge of the plate are configured to provide coolant droplets to the first surface of the elements;
   a coolant distribution structure formed as part of the fluid flow field plate, the coolant distribution structure configured to direct coolant droplets into the flow field channels; and
   wherein the coolant distribution structure comprises one or more elements associated with one or more flow field channels, the elements having a first surface for receiving a coolant droplet and a second surface having a shape that defines a coolant droplet detachment region for directing a coolant droplet into the associated flow field channel.

2. The bipolar fuel cell plate of claim 1, further comprising a plurality of coolant introducing openings configured to provide coolant droplets to the first surface of the elements.

3. The bipolar fuel cell plate of claim 2, wherein the elements are located in a line of sight between the coolant introducing openings and the flow field channels.

4. The bipolar fuel cell plate of claim 2, wherein the elements are each associated with two coolant introducing openings.

5. The bipolar fuel cell plate of claim 2, further comprising a plurality of air introducing openings for providing air to the flow field channels, wherein air received from the air introducing openings is configured to cause droplets to pass from the coolant distribution structure to the flow field channels.

6. The bipolar fuel cell plate of claim 5, wherein the air received from the air introducing openings is configured to cause droplets to pass from the coolant introducing openings to the first surface of the elements.

7. The bipolar fuel cell plate of claim 5, wherein the air received from the air introducing openings is configured to cause the coolant droplets to travel along a side surface of an element as they pass from the first surface to the second surface of the element.

8. The bipolar fuel cell plate of claim 1, wherein the droplet detachment region defines an apex in the shape of the second surface of the elements.

9. The bipolar fuel cell plate of claim 1, wherein the droplet detachment region has a lowest radius of curvature in the second surface of the elements in the coolant distribution structure.

10. The bipolar fuel cell plate of claim 1, wherein the elements are configured to support a gas diffusion layer.

11. The bipolar fuel cell plate of claim 10, wherein the elements are configured to support the gas diffusion layer beyond the ends of the fluid flow channels thereby keeping open the openings into the flow field channels.

12. The bipolar fuel cell plate of claim 1, further comprising a support structure comprising a plurality of support elements at the downstream end of the flow field channels, the support elements configured to support a gas diffusion layer.

13. The bipolar fuel cell plate of claim 12, wherein the support elements are the same shape as the elements of the coolant distribution structure.

14. The bipolar fuel cell plate of claim 1, wherein the coolant distribution structure comprises an element associated with each of the flow field channels.

15. The bipolar fuel cell plate of claim 1, wherein the bipolar fuel cell plate is made from pressed steel.

16. The bipolar fuel cell plate of claim 1, wherein the height of the elements in the coolant distribution structure is substantially the same as the height of corrugations that define the fluid flow channels.

17. The bipolar fuel cell plate of claim 1, wherein the folded region comprises a port through the thickness of the plate and in fluid communication with the arrays of fluid distribution channels.

18. The bipolar fuel cell plate of claim 3, wherein the elements are each associated with two coolant introducing openings.

19. The bipolar fuel cell plate of claim 18 further comprising a plurality of air introducing openings for providing air to the flow field channels, wherein air received from the air introducing openings is configured to cause droplets to pass from the coolant distribution structure to the flow field channels.

* * * * *